Figure 1:
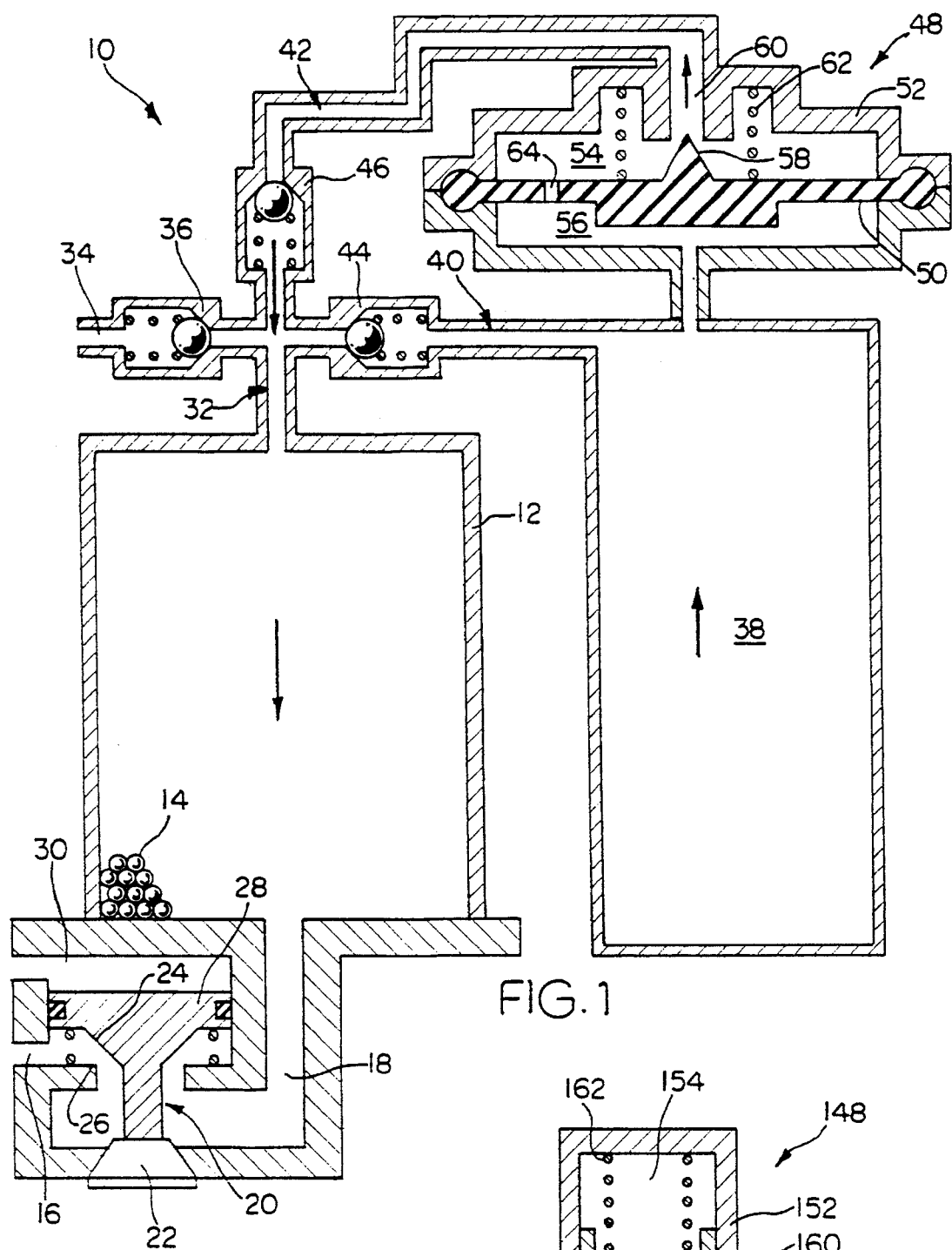

United States Patent [19]
VanderMolen

[11] Patent Number: 5,458,677
[45] Date of Patent: Oct. 17, 1995

[54] AIR DRYER MECHANISM WITH FLOW REGULATED PURGE PRESSURE

[75] Inventor: Gary L. VanderMolen, West Lafayette, Ind.

[73] Assignee: AlliedSignal Truck Brake Systems Company, Elyria, Ohio

[21] Appl. No.: 238,411

[22] Filed: May 5, 1994

[51] Int. Cl.⁶ ............................ B01D 53/04; B01D 53/26
[52] U.S. Cl. ............................... 96/113; 96/114; 96/116; 96/141; 96/144
[58] Field of Search ..................... 96/108–110, 113, 96/114, 116, 133, 141, 144

[56] References Cited

U.S. PATENT DOCUMENTS

| | | | |
|---|---|---|---|
| 3,323,292 | 6/1967 | Brown | 96/110 |
| 3,472,000 | 10/1969 | Glass et al. | 96/113 |
| 3,592,563 | 7/1971 | Glass et al. | 96/113 X |
| 3,937,622 | 2/1976 | Hewitt et al. | 96/113 |
| 4,026,685 | 5/1977 | Grix | 96/113 |
| 4,047,909 | 9/1977 | Hofmann | 96/113 |
| 4,487,617 | 12/1984 | Dienes et al. | 96/113 |
| 4,764,189 | 8/1988 | Yanagawa et al. | 96/114 |
| 4,892,569 | 1/1990 | Kojima | 96/113 |
| 5,110,327 | 5/1992 | Smith | 96/113 |
| 5,129,927 | 7/1992 | Tsubouchi | 96/113 |
| 5,286,282 | 2/1994 | Goodell et al. | 96/113 |
| 5,286,283 | 2/1994 | Goodell | 96/113 |

FOREIGN PATENT DOCUMENTS

| | | | |
|---|---|---|---|
| 60-022555 | 2/1985 | Japan | 96/109 |
| 60-094116 | 5/1985 | Japan | 96/113 |

*Primary Examiner*—Robert Spitzer
*Attorney, Agent, or Firm*—Leo H. McCormick, Jr.

[57] ABSTRACT

An air drying mechanism for a compressed air braking system includes a housing containing desiccant material, and a purge volume which stores air for backflowing through the desiccant to purge the latter of its moisture content. A flow regulating control valve is located between the purge volume and the desiccant to provide a constant flow rate of purge air through the desiccant during purging.

16 Claims, 1 Drawing Sheet

AIR DRYER MECHANISM WITH FLOW REGULATED PURGE PRESSURE

This invention relates to an air dryer mechanism for a compressed air system, such as a compressed air braking system, in which the flow rate of the purge air is regulated to provide a substantially constant flow rate of the purge air through the desiccant over a significant portion of the purge cycle.

Compressed air systems are widely used on heavy duty automotive vehicles to operate the vehicle braking system. It has become customary in such systems to provide an air dryer which includes a desiccant material which removes moisture entrained in the compressed air. The desiccant used in such systems must be purged periodically by backflowing a portion of the compressed air dried by the desiccant through the desiccant bed. The purge air is usually kept segregated in a separate purge volume. A flow restrictive orifice is provided between the purge volume and the desiccant to regulate flow of purge air through the desiccant. However, a simple orifice to control flow results in a flow through the desiccant bed at varying flow rates during the purge cycle, which reduces the efficiency of the dryer.

The present invention regulates the flow rate of the purge air in the desiccant to achieve a substantially constant flow rate of the purge air through the desiccant over a significant portion of the purge cycle, until the pressure of the purge air drops below this level. By maintaining a substantially constant flow rate of the purge air through the desiccant during a significant portion of the purge cycle, purging of the desiccant is optimized, and the dew point depression capacity of the desiccant is optimized as compared to the standard purging system in which flow is through a fixed orifice and thus varies substantially during the purge cycle.

Figure 2:
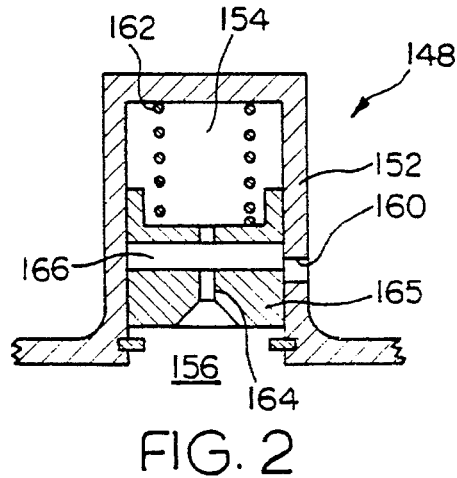

These and other advantages of the present invention will become apparent from the following description, with reference to the accompanying drawing, in which:

FIG. 1 is a schematic illustration of an air drying mechanism made pursuant to the teaching of the present invention; and FIG. 2 is a cross sectional view of an alternate embodiment of the purge valve used in the air drying mechanism of FIG. 1.

Referring now to FIG. 1, an air dryer mechanism generally indicated by the numeral 10 includes a housing 12 which is loaded with a desiccant material generally indicated at 14. The housing 12 includes a supply port 16, which is connected to a source of compressed air, such as an air compressor. The supply port 16 is communicated with the desiccant 14 contained within the housing 12 via an inlet flow path 18. A combination inlet and purge valve generally indicated by the numeral 20 includes a purge valve portion 22 that, when opened, communicates the flow path 18 to atmosphere. The valve member 20 further includes an inlet valve portion 24 that closes against seat 26 when the purge valve 22 is opened, thereby closing off the supply port 16, and a piston portion 28 that is responsive to the pressure level at control port 30 to move the valve member 28 from a normal position illustrated in the drawings in which the valve members 24, 26 are open and the purge valve 22 is closed to a position in which the valve members 24, 26 are closed and the purge valve 22 is open. The port 30 is connected to, for example, a governing device which is responsive to the pressure level in the air reservoir (not shown) to unload the compressor and to generate the signal communicated to the port 30 for operating the valve member 20. Housing 12 further includes an outlet flow path 32 connected to a delivery port 34, which is communicated to the aforementioned air reservoirs (not shown) through a one-way check valve 36, which permits flow from the housing 12 to the delivery port 34, but prevents flow in the reverse direction.

Air drying mechanism 10 further includes a housing defining a purge volume 38 which is connected to the outlet flow path 32 via a first branch flow path 40 and a second branch flow path 42. A check valve 44 in the branch 40 permits communication from the outlet flow path 32 into the purge volume 38, and a check valve 46 permits purge air during purging to flow from the purge volume 38, through a constant flow rate regulating valve generally indicated by the numeral 48 which will be described in detail hereinafter, into the desiccant 14 contained within housing 12. Accordingly, the first branch 40 permits communication of air to be used for purging from the outlet flow path 32 into the purge volume 38, and during purging compressed air is communicated from the purge volume 38 through the second branch 42 into the desiccant 14 contained within the housing 12 for purging the latter.

The constant flow rate regulating valve 48 maintains a substantially constant flow rate of compressed air through the second flow path 42 downstream of the constant flow rate regulating valve 48 during purging. Constant flow rate regulating valve 48 includes a diaphragm 50 which divides a chamber defined within a housing 52 into a reference chamber 54 and an inlet chamber 56 which communicates with purge volume 38. A conical projection 58 extends from the diaphragm 50 and cooperates with outlet port 60 to define a variable area orifice therebetween, the area of the orifice varying according to the position of the diaphragm 50 as will hereinafter be explained. The outlet 60 is communicated through the check valve 46 into the desiccant 14. A spring 62 yieldably urges the diaphragm 50 away from the outlet 60. A fixed orifice 64 in diaphragm 50 communicates inlet chamber 56 with reference chamber 54.

In operation, compressed air enters supply port 16 and (assuming control port 30 is vented) passes between the valve elements 24, 26 and communicates through flow path 18 into the volume defined within the housing 12 in which the desiccant 14 is located. After flowing through the desiccant, the compressed air leaves housing 12 through outlet flow path 32. Initially, compressed air flows through check valve 44 into the branch flow path 40 to charge the reservoir 38. After purge volume 38 has been charged, compressed air communicates through the check valve 36 and out of the outlet or delivery port 34 to charge the aforementioned air reservoirs.

When the reservoirs are fully charged, the aforementioned governing device (not shown) generates an output signal which unloads the compressor and which is also received at control port 30. The pressure signal received at control point 30 forces the valve member 20 downwardly, viewing FIG. 1, thereby closing off the valve elements 24, 26 to thereby block communication through supply port 16, and simultaneously opening the purge valve 22, thereby exhausting pressure in the housing 12 containing the desiccant material 14 to atmosphere. As the purge valve 22 remains open, air flows from the purge volume 38 through the constant flow rate regulator valve 48 and check valve 46 to continue purging the desiccant 14.

Compressed air communicates out of the purge volume 38, through the fixed orifice 64, and through the outlet 60, to the desiccant 14. The pressure drop across orifice 64 results in a lower pressure level in reference chamber 54 than in inlet chamber 56. This force imbalance moves the diaphragm 50 against the spring 62 thereby forcing the projection 58 further into the outlet 60, thereby reducing the flow area of the orifice. As the pressure in the purge volume 38 drops, the pressure in inlet chamber 56 also drops, so that the spring 62 urges the diaphragm 50 away from the outlet 60. Regardless of the change of pressure in the purge volume 38, the spring 62 maintains the same pressure level in reference chamber 54 and thus the pressure drop across the orifice defined by the outlet 60 and projection 58 will also be constant. Since the pressure drop across the orifice defined by the projection 58 and outlet 60 is constant, flow through this orifice will also be constant, so that accordingly a constant flow rate is maintained through the desiccant 14, regardless of the pressure change in purge volume 38.

In the alternate embodiment of FIG. 2, elements the same or substantially the same as those in the preferred embodiment retain the same reference character, but increased by 100. In the flow regulating valve 148 in FIG. 2, the diaphragm 50 in the embodiment of FIG. 1 is replaced by a piston 165 in. The upper surface (viewing FIG. 2) of the piston 165 cooperates with the housing 152 to define the reference chamber 154 therebetween. A spring 162 retained in housing 152 urges the piston downwardly viewing FIG. 2. A fixed orifice is defined at 164, which communicates the inlet chamber 156 to the reference chamber 154. Passages 166 communicate through outlet opening 160, which is communicated to the desiccant bed. As the piston 165 moves upwardly and downwardly, viewing FIG. 2, the cross-sectional area of the passage 166 is varied, thereby defining an orifice between the opening 160 and the passage 166. The pressure drop across this orifice is constant as described above because of the action of the spring 162.

I claim:

1. Air drying mechanism for a compressed air system comprising a housing containing a desiccant for drying compressed air, a supply port for supplying air to be dried to said desiccant, a delivery port for discharging dried compressed air from said desiccant, a purge volume for storing a quantity of compressed air for periodic back flow through the desiccant to regenerate the desiccant, means defining a flow path from said purge volume through said desiccant to atmosphere, a normally closed purge valve in said flow path, said purge valve being responsive to a purge control signal to open for discharging compressed air through said flow path from said purge volume to atmosphere through said desiccant, and flow regulating control means for regulating flow of compressed air from said purge volume to said desiccant during purging of the desiccant for maintaining a substantially constant flow rate of compressed air through said desiccant when said purge valve is open until the pressure level in said purge volume drops below a predetermined pressure level.

2. Air drying mechanism as claimed in claim 1, wherein said flow regulating control means is a compressed air flow rate regulating purge control valve.

3. Air drying mechanism as claimed in claim 2, wherein said compressed air flow rate regulating purge control valve is in said flow path between the purge volume and the desiccant.

4. Air drying mechanism as claimed in claim 3, wherein said compressed air flow rate regulating purge control valve includes a pressure responsive member movable within a housing to define a regulating chamber, and a variable orifice communicating said regulating chamber with said flow path.

5. Air drying mechanism as claimed in claim 4, wherein said pressure responsive member includes means for controlling the size of said variable orifice in response to movement of the pressure responsive member.

6. Air drying mechanism as claimed in claim 5, wherein said compressed air flow rate regulating purge control valve includes a spring controlling said pressure responsive member to establish a constant flow rate through said variable orifice.

7. Air drying mechanism as claimed in claim 5, wherein a fixed orifice communicates said purge volume with said regulating chamber.

8. Air drying mechanism as claimed in claim 7, wherein said fixed orifice is carried by said pressure responsive member.

9. Air drying mechanism as claimed in claim 8, wherein said pressure responsive member is a flexible diaphragm.

10. Air drying mechanism as claimed in claim 8, wherein said pressure responsive member is a piston slidable within a bore defined within said housing.

11. Air drying mechanism for a compressed air system comprising a housing containing a desiccant for drying compressed air, a supply port for supplying air to be dried to said desiccant, a delivery port for discharging dried compressed air from said desiccant, a purge volume for storing a quantity of compressed air for periodic back flow through the desiccant to regenerate the desiccant, means defining a flow path from said purge volume through said desiccant to atmosphere, a normally closed purge valve in said flow path, said purge valve being responsive to a purge control signal to open for discharging compressed air through said flow path from said purge volume to atmosphere through said desiccant, and flow regulating control means for regulating flow of compressed air from said purge volume to said desiccant during purging of the desiccant, said flow regulating control means including a pressure responsive member movable within a housing to define a regulating chamber, a variable orifice communicating said regulating chamber with said flow path, and a fixed orifice communicating said purge volume with said regulating chamber.

12. Air drying mechanism as claimed in claim 11, wherein said pressure responsive member includes means for controlling the size of said variable orifice in response to movement of the pressure responsive member.

13. Air drying mechanism as claimed in claim 12, wherein said flow regulating control means includes a spring controlling said pressure responsive member to establish the flow rate through said variable orifice.

14. Air drying mechanism as claimed in claim 11, wherein said fixed orifice is carried by said pressure responsive member.

15. Air drying mechanism as claimed in claim 11, wherein said pressure responsive member is a flexible diaphragm.

16. Air drying mechanism as claimed in claim 11, wherein said pressure responsive member is a piston slidable within a bore defined within said housing.

\* \* \* \* \*